Sept. 2, 1930.  W. W. DAVIN  1,775,020
FLOAT SWITCH
Filed Oct. 3, 1927
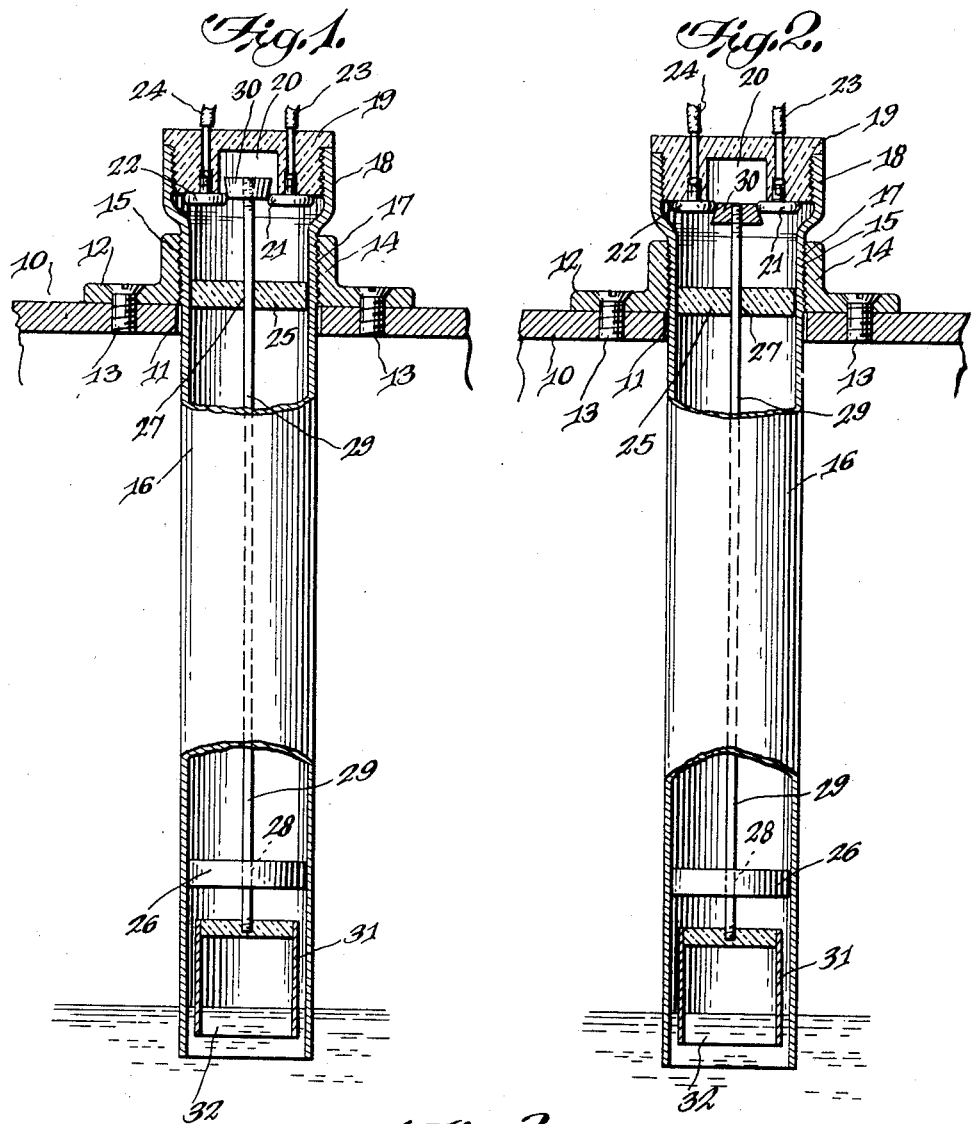
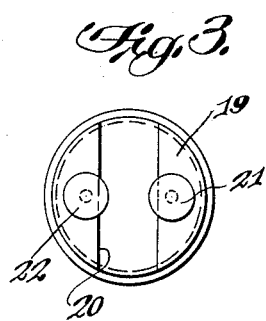

Patented Sept. 2, 1930

1,775,020

UNITED STATES PATENT OFFICE

WALTER W. DAVIN, OF CHICAGO, ILLINOIS; JOHN N. LIAUTAUD, ADMINISTRATOR OF SAID WALTER W. DAVIN, DECEASED, ASSIGNOR, BY DIRECT AND MESNE ASSIGNMENTS, OF ONE-HALF TO ROBERT MALCOLM AND ONE-HALF TO CHARLES F. VEE, BOTH OF CHICAGO, ILLINOIS

FLOAT SWITCH

Application filed October 3, 1927. Serial No. 223,684.

This invention relates to certain novel improvements in liquid level indicating devices and is particularly directed to a device adapted for use in connection with water storage tanks.

The primary object of my invention is to provide a liquid level indicating device which may be used in connection with water tanks and the like so as to indicate the high or low level therein.

Another object of the invention is to provide a device of the foregoing character which will be quick acting and positive in operation.

A further object of the invention is to provide a device of the foregoing character which will operate in an accurate manner even though the water or the like in the tank is in motion.

A further object of the invention is to provide a device of the foregoing character which will be simple and economical in construction.

Other objects will appear hereinafter.

The invention consists in the novel combination and arrangement of parts to be hereinafter described and claimed.

The invention will be best understood by reference to the accompanying drawings, showing the preferred form of construction and in which:

Fig. 1 is a view partially in elevation and partially in section depicting a preferred form of construction for my invention adapted for indicating the low level in a water tank;

Fig. 2 is a view similar to Fig. 1 showing an embodiment of my invention adapted for indicating the high level in a water tank; and Fig. 3 is a bottom plan view of the contact construction employed in my device.

In the drawings wherein a preferred embodiment of my invention is illustrated, 10 indicates the upper wall of a suitable water storage tank of any approved design. An opening 11 is provided in the wall 10 and the supporting member 12 is secured to the tank 10 in any desired manner as by the bolts 13. The supporting member 12 includes an upwardly extending flange 14 which has a screw threaded opening extending therethrough that is adapted to be disposed in alignment with the opening 11.

A tubular member 16 is provided which has screw threads 17 on the periphery thereof disposed in juxtaposition to the enlarged end 18 of the tubular member 16. The screw thread portion 17 is adapted to be mounted in the opening 15 in such a manner that the greater part of the tubular member 16 is disposed within the tank defined by the walls 10. In the enlarged end 18 a block 19 of insulating material is screw threadedly fitted. The block 19 has a diametrical slot 20 therein. Contacts 21 and 22 are fitted into the block 19 in any approved manner and are arranged so as to embody enlarged heads which are disposed so as to extend over the slot 20. Conductors 23 and 24 are secured to the contacts 21 and 22 in any approved manner as by being inserted into holes provided in the contacts and then being soldered thereto.

Suitably supported in the tubular member 16 and spaced apart therein so as to be disposed adjacent the upper and lower ends thereof, are guide blocks 25 and 26 which have axial openings 27 and 28 therein. A rod 29 extends through the openings 27 and 28 and the conically shaped contact head 30 is suitably secured on the upper end of said rod 29. In the embodiment of the invention illustrated in Fig. 1, the conical head 30 is disposed so as to have the apex end thereof extending downward and in this instance the contact end 30 is disposed in the slot 20. Therefore, when the rod 29 is in its lowermost position, the contact head 30 will engage the portions of the contacts 21 and 22 which extend over the slot 20.

The tubular member 16 extends into the tank a distance sufficient to lie just above the intended lower level of the water or the like to be contained in said tank. A can like member 31 is suitably secured to the lower end of the rod 29 and this can like member is arranged so as to embody an open end 32. The remaining portion of this can like member 31 is preferably arranged so as to be substantially air tight. As is clearly illustrated in the drawings, the can like member 31 is spaced away from the inner walls of the member 16.

Assuming that the can like member 31 is so positioned that the contact head 30 is engaging the contacts 21 and 22 in the manner depicted in Fig. 1 and that the liquid in the tank is at a lower level than the end of the cylindrical member 16, the circuit will be closed, water or the like will be introduced into the tank and as the level therein rises it is apparent that part of the water will enter the cylindrical member 16 and will therefore pass through the open end 32 of the can like member 31. Therefore, since the remaining portions of the can like member 31 are airtight, it is apparent that a quantity of the air will be trapped therein. As the water continues to rise, the air in the can like member 31 will be compressed and when a predetermined pressure is built up therein, which will be controlled by the weight of the can like member 31, rod 29, and contact head 30, all of which parts will be relatively light in weight, these members will be forced upwardly in a comparatively rapid manner thus producing a quick break between the contact head 30 and the contacts 21 and 22. The conductors 23 and 24 may be led to a suitable signaling device or these conductors might be directed to a relay which would operate to break the circuit to the motor means forcing water into the tank. It is therefore apparent that this device will function only when the water level is at a predetermined height and as long as this height is maintained the air trapped in can like member 31 will be held under a sufficient compression to hold the contact head 30 out of engaging position. However, as soon as the liquid level falls, it is apparent that the air pressure will be reduced and thus the contact head 30 will fall back into engagement with the contacts 21 and 22 and thus the low level of fluid in the tank will be indicated.

In Fig. 2, as stated, the contact head 30 is disposed to lie below the contacts 21 and 22. Therefore, this device will act to close the circuit when the air pressure in the can like member 31 elevates the rod 29 and the contact head 30. Therefore, this construction may be used to indicate the high level in the tank.

If desired, both the devices indicated in Figs. 1 and 2 may be mounted on one tank so as to indicate the predetermined high and low levels or if desired only one of these devices may be used dependent upon which level is the most important and in greatest need of indication.

Devices embodying a float have been used in art heretofore but inasmuch as the water being introduced into the tank, causes the surface of the water to be set in motion, it is apparent that a float used in place of the can like member 31 would bob up and down and thus the desired effect would not be obtained. Further, a float would embody the disadvantage of slowly breaking the contact since the rise thereof would be proportionate to the rise of the water. However, my device does not function until a predetermined height of water has been attained or receded to so as to build up or reduce the air pressure in the can like member 31. Further, wavy movement of water will have no effect on my device since it is securely guarded against lateral movement by extent of the rod through the openings 27 and 28 and it is apparent that the wavy movement of the water will not be indicative of the true height for a period sufficient to maintain an air pressure great enough to cause the device to function.

While I have illustrated and described the preferred form of construction for carrying my invention into effect, this is capable of variation and modification, without departing from the spirit of the invention. I, therefore, do not wish to be limited to the precise details of construction set forth, but desire to avail myself of such variation and modifications as come within the scope of the appended claim.

Having thus described my invention, what I claim as new and desire to protect by Letters Patent is:

In combination with a liquid containing tank provided with a top having an opening, a liquid level indicating unit comprising an internally threaded flanged collar adapted to be secured on said top about the opening, an open ended shell internally and externally threaded at its upper end, the externally threaded end screwing into the internally threaded collar to permit vertical adjustment of the shell in the tank, guide members mounted at spaced points in said shell, a tubular member arranged within the lower end of said shell and having a lower open end disposed toward the lower open end of said shell, a rod secured to the closed upper end of the tubular member and disposed upwardly through said guide members, said rod and tubular member being adapted to reciprocate vertically in said shell through the action of the trapped air compressed in the member by the rising liquid entering the bottom of said shell, an insulator block threaded into the internally threaded upper end of said shell, a pair of electrical contacts carried by said insulator block and disposed in said shell, and a contact element mounted on the upper end of said rod and adapted to form contact with said pair of contacts.

In testimony whereof I affix my signature.

WALTER W. DAVIN.